(12) United States Patent
Persson et al.

(10) Patent No.: US 12,334,990 B2
(45) Date of Patent: Jun. 17, 2025

(54) OVER-THE-AIR BASED ESTIMATION OF PHASE ACCURACY OF A RADIO TRANSCEIVER DEVICE

(71) Applicant: Telefonaktiebolaget LM Ericsson (publ), Stockholm (SE)

(72) Inventors: Lars Persson, Åsa (SE); Torbjörn Elfström, Fjärås (SE); Christer Engdahl, Särö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 246 days.

(21) Appl. No.: 18/023,013

(22) PCT Filed: Aug. 25, 2020

(86) PCT No.: PCT/EP2020/073722
§ 371 (c)(1),
(2) Date: Feb. 24, 2023

(87) PCT Pub. No.: WO2022/042824
PCT Pub. Date: Mar. 3, 2022

(65) Prior Publication Data
US 2023/0327784 A1 Oct. 12, 2023

(51) Int. Cl.
*H04B 17/12* (2015.01)
(52) U.S. Cl.
CPC .................. *H04B 17/12* (2015.01)
(58) Field of Classification Search
CPC ......... H04B 17/12; H04B 17/26; H04B 17/21
(Continued)

(56) References Cited

U.S. PATENT DOCUMENTS 6,983,127 B1    1/2006  Da Torre et al.
2015/0229417 A1*  8/2015  Reed ...................... H04B 17/21
                                                        375/226
(Continued)

FOREIGN PATENT DOCUMENTS

CN       103907290 A     7/2014
WO    2010150269 A2    12/2010
(Continued)

OTHER PUBLICATIONS

International Search Report and Written Opinion for International Patent Application No. PCT/EP2020/073722, mailed Apr. 26, 2021, 14 pages.
(Continued)

*Primary Examiner* — Don N Vo
(74) *Attorney, Agent, or Firm* — Withrow & Terranova, PLLC

(57) ABSTRACT

There is provided mechanisms for OTA based estimation of phase accuracy of a first radio transceiver device. A method is performed by a controller. The method comprises obtaining, per each position in a sequence of positions of a second radio transceiver device relative the first radio transceiver device, a phase relation estimate between transceiver branches of the first radio transceiver device. Each phase relation estimate is obtained from measurements on a signal wirelessly transmitted between the first radio transceiver device and the second radio transceiver device. The method comprises estimating an average phase relation for at least one pair of the transceiver branches of the first radio transceiver device by averaging the obtained phase relation estimates over all the positions in the sequence of positions. The phase accuracy of the first radio transceiver device is represented by the average phase relation for the at least one pair of the transceiver branches.

19 Claims, 12 Drawing Sheets

(58) Field of Classification Search
USPC .......................................................... 455/73
See application file for complete search history.

(56) References Cited

U.S. PATENT DOCUMENTS

| | | | |
|---|---|---|---|
| 2018/0337739 A1 | 11/2018 | Petersson et al. | |
| 2019/0052373 A1* | 2/2019 | Haub ................... | H04B 17/318 |
| 2019/0124529 A1* | 4/2019 | García ................. | H04W 24/06 |
| 2023/0171009 A1* | 6/2023 | Han ...................... | H04B 17/15 |
| | | | 370/252 |

FOREIGN PATENT DOCUMENTS

| | | |
|---|---|---|
| WO | 2020125958 A1 | 6/2020 |
| WO | 2021037354 A1 | 3/2021 |

OTHER PUBLICATIONS

Li, Yukun, et al., "Amplitude-Phase Error Calibration Method for Multiple Transmit Multiple Receive SAR System," Radar Science and Technology, vol. 16, Issue 2, Apr. 15, 2018, 7 pages.
Notification to Grant for Chinese Patent Application No. 202080103486.5, mailed Apr. 17, 2025, 8 pages.

* cited by examiner

US 12,334,990 B2

OVER-THE-AIR BASED ESTIMATION OF PHASE ACCURACY OF A RADIO TRANSCEIVER DEVICE

This application is a 35 U.S.C. § 371 national phase filing of International Application No. PCT/EP2020/073722, filed Aug. 25, 2020, the disclosure of which is incorporated herein by reference in its entirety.

TECHNICAL FIELD

Embodiments presented herein relate to a method, a controller, a computer program, and a computer program product for over-the-air (OTA) based estimation of phase accuracy of a radio transceiver device.

BACKGROUND

Active Antenna Systems (AAS) are an important part of both fourth generation (4G) telecommunication systems such as LTE (Long Term Evolution) and fifth generation (5G) telecommunication systems, such as NR (New Radio). AAS is a generic term that is often used to describe (radio) access nodes and other types of base stations that incorporate a large number of separate transmitters, receivers and antenna elements that can be used for MIMO (Multiple Input Multiple Output) communication and beamforming as an integrated product.

To be able to control the beamforming, the base station needs to be capable to control the array excitation (in terms of amplitude and phase) with a specified accuracy. Therefore, the base station is calibrated at the factory as part of the manufacturing process and/or in the background during normal operation.

The term beam quality is a collective name for beam forming parameters, such as peak EIRP (Equivalent Isotropically Radiated Power), side-lobe suppression, beam pointing error, beam width, etc. commonly used to characterize the AAS. The beam quality associated to beams generated by an AAS is determined by the design, including antenna and radio hardware and software algorithms, such as antenna calibration algorithms.

Calibration ensures that the excitation amplitude and phase relations for each transceiver branch in the AAS are as intended. If this is not the case, this will have an impact on the beamforming and thereby degrading the beam quality. Calibration data can be applied to the antenna excitation to compensate for error occurring due to aging, temperature, component variation, mechanical tolerances, etc.

FIG. 1 illustrates an example of the beam quality degradation due to array excitation phase errors, where the impact of gaussian distributed phase errors is visualized for a standard deviations of 30 degrees; $\sigma=0$ represents the directivity without any array excitation phase errors and $\sigma=60$ represents the directivity where the array excitation phase errors have a standard deviations of 30 degrees. An AAS in the form of a ULA (Uniform Linear Array) with 10 physical antenna elements with an antenna element separation $0.9\lambda$ is assumed.

When the AAS is deployed, factors such as hailstorms, material properties degradation, external interference, etc. can disturb the calibration process, which result in reduced uplink and downlink performance.

For an AAS with support for communication over a large frequency spectrum (many times shared with other services), advanced beamforming functionality and deployment scenarios, the level of complexity for OTA out in the field for network testing has increased significantly. There is therefore a need for mechanisms to be used by network operators to monitor network performance and by regulators to monitor parameters in license condition in deployed networks.

Hence, there is still a need for improved ways to ensure that the AAS, or other type of radio transceiver devices, perform as intended, for example by having been successfully calibrated.

SUMMARY

An object of embodiments herein is to enable efficient determination that a radio transceiver device, such as an AAS, performs as intended.

According to a first aspect there is presented a method for OTA based estimation of phase accuracy of a first radio transceiver device. The method is performed by a controller. The method comprises obtaining, per each position in a sequence of positions of a second radio transceiver device relative the first radio transceiver device, a phase relation estimate between transceiver branches of the first radio transceiver device. Each phase relation estimate is obtained from measurements on a signal wirelessly transmitted between the first radio transceiver device and the second radio transceiver device. The method comprises estimating an average phase relation for at least one pair of the transceiver branches of the first radio transceiver device by averaging the obtained phase relation estimates over all the positions in the sequence of positions. The phase accuracy of the first radio transceiver device is represented by the average phase relation for the at least one pair of the transceiver branches.

According to a second aspect there is presented a controller for OTA based estimation of phase accuracy of a first radio transceiver device. The controller comprises processing circuitry. The processing circuitry is configured to cause the controller to obtain, per each position in a sequence of positions of a second radio transceiver device relative the first radio transceiver device, a phase relation estimate between transceiver branches of the first radio transceiver device. Each phase relation estimate is obtained from measurements on a signal wirelessly transmitted between the first radio transceiver device and the second radio transceiver device. The processing circuitry is configured to cause the controller to estimate an average phase relation for at least one pair of the transceiver branches of the first radio transceiver device by averaging the obtained phase relation estimates over all the positions in the sequence of positions. The phase accuracy of the first radio transceiver device is represented by the average phase relation for the at least one pair of the transceiver branches.

According to a third aspect there is presented a controller for OTA based estimation of phase accuracy of a first radio transceiver device. The controller comprises an obtain module configured to obtain, per each position in a sequence of positions of a second radio transceiver device relative the first radio transceiver device, a phase relation estimate between transceiver branches of the first radio transceiver device. Each phase relation estimate is obtained from measurements on a signal wirelessly transmitted between the first radio transceiver device and the second radio transceiver device. The controller comprises an estimate module configured to estimate an average phase relation for at least one pair of the transceiver branches of the first radio transceiver device by averaging the obtained phase relation estimates over all the positions in the sequence of positions.

The phase accuracy of the first radio transceiver device is represented by the average phase relation for the at least one pair of the transceiver branches.

According to a fourth aspect there is presented a computer program for OTA based estimation of phase accuracy of a first radio transceiver device, the computer program comprising computer program code which, when run on a controller, causes the controller to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, the average phase relation for the transceiver branches can be used to determine whether the first radio transceiver device performs as intended.

Advantageously, the average phase relation for the transceiver branches can be used to determine whether the first radio transceiver device has been successfully calibrated or not.

Advantageously these aspects enable functionality and performance of the first radio transceiver device to be tested out in the field in a convenient and cost-efficient way. Also, the impact of multi-path environment can be mitigated.

A more traditional way of testing the beam quality of the first radio transceiver device would be to dismantle it from its site, bring it to an advanced test facility, such as an antenna test range, and perform tests. This would be time consuming, costly and imply an extended system down time if an exchange of the first radio transceiver device during testing is not carried out.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above there is still a need for improved ways to ensure that the AAS, or other type of radio transceiver devices, has been successfully calibrated.

In further detail, currently, it could be challenging to evaluate the performance of the antenna calibration of a deployed radio transceiver device. The radio transceiver device could be sent back to the factory, or to a laboratory, for evaluating the performance. This could be very costly since the deployed radio transceiver device are numerous and in many cases are located in remote and hard to reach places, often in high masts. Moreover, when the functionality of a radio transceiver device is failing it can be difficult to identify the root cause from a network point of view. The network performance is typically related to increased interference from external sources, e.g. a neighboring network or other service. Even though in reality, it is the performance of the radio transceiver device itself that is degraded.

The embodiments disclosed herein therefore relate to mechanisms for OTA based estimation of phase accuracy of a radio transceiver device. Such mechanisms could be used to ensure that an AAS, or other type of radio transceiver devices, has been successfully calibrated. In order to obtain such mechanisms there is provided a controller, a method performed by the controller, a computer program product comprising code, for example in the form of a computer program, that when run on a controller, causes the controller to perform the method.

Figure 1:
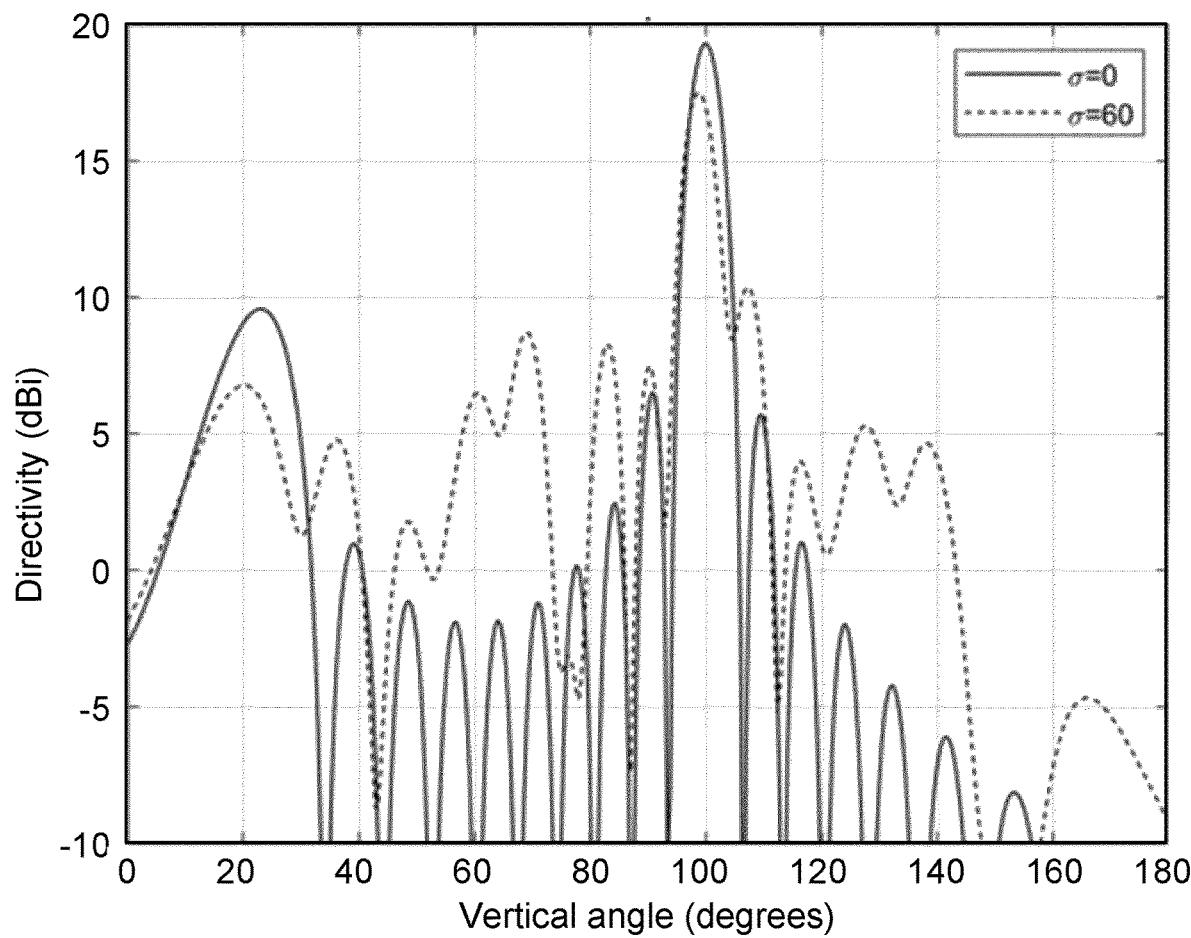
FIG. 1 schematically illustrates an example of beam quality degradation due to array excitation phase errors according to an embodiment.
Figure 2:
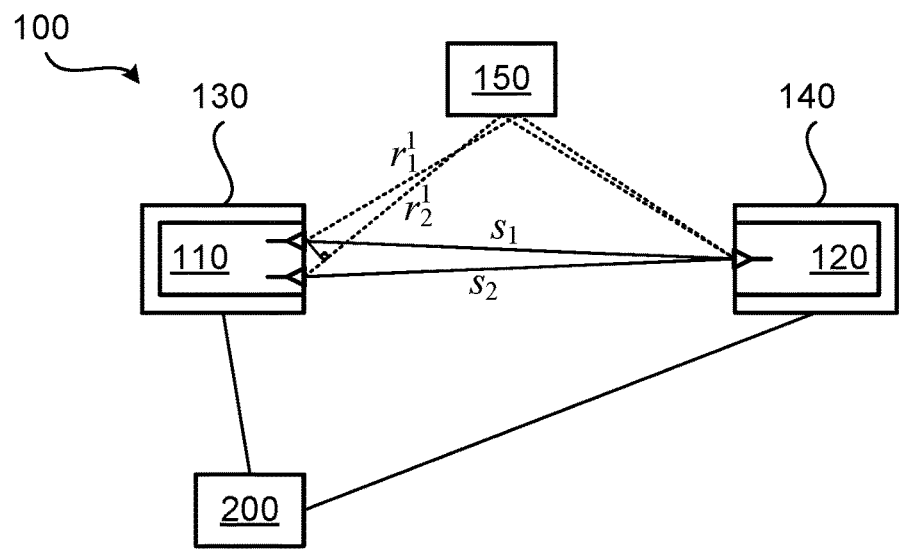
FIG. 2 is a schematic diagram illustrating a communication network according to embodiments.

FIG. 2 is a schematic diagram illustrating a communications network 100 where embodiments presented herein can be applied. The communications network 100 comprises a first radio transceiver device 110, a second radio transceiver device 120, and a controller 200. Wireless transmission of signals between the first radio transceiver device 110 and the second radio transceiver device 120 might be reflected by a physical object 150.

In some non-limiting examples, the first radio transceiver device 110 is a (radio) access node. Some non-limiting examples of (radio) access nodes are: radio access network nodes, radio base stations, base transceiver stations, node Bs (NBs), evolved node Bs (eNB), gNBs, access points, and integrated access and backhaul (IAB) nodes. In some non-limiting examples, the second radio transceiver device 120 is a user equipment. Non-limiting examples of user equipment are portable wireless devices, mobile stations, mobile phones, handsets, wireless local loop phones, smartphones, laptop computers, tablet computers, network equipped sensors, network equipped vehicles, and Internet of Things devices.

The controller 200 may either be provided as a separate device, or be collocated, integrated, or part of another device, such as the first radio transceiver device 110, the second radio transceiver device 120, or another entity, such as a network controller.

In FIG. 2, direct components of the signals are denoted $s_1$ and $s_2$ whereas components of the signals having been reflected by the object 150 are denoted $r_1^1$ and $r_2^1$. The controller 200 is at least configured to estimate an average phase relation for transceiver branches of the first radio transceiver device 110. Further details of this as well as other aspects of the controller 200 will be disclosed below.

Figure 3:
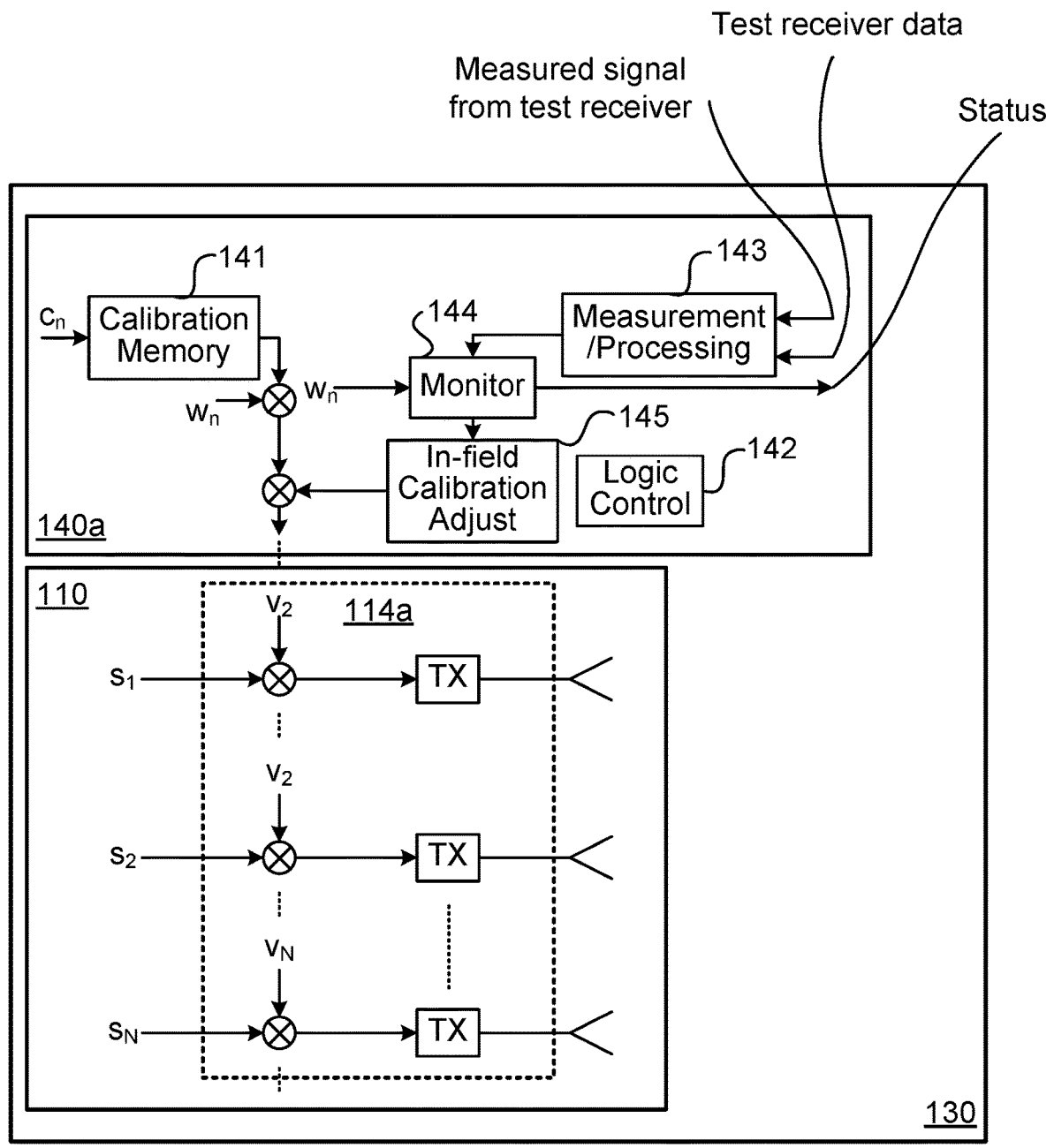
FIGS. 3 and 4 schematically illustrate components of an access node according to an embodiment.
Figure 4:
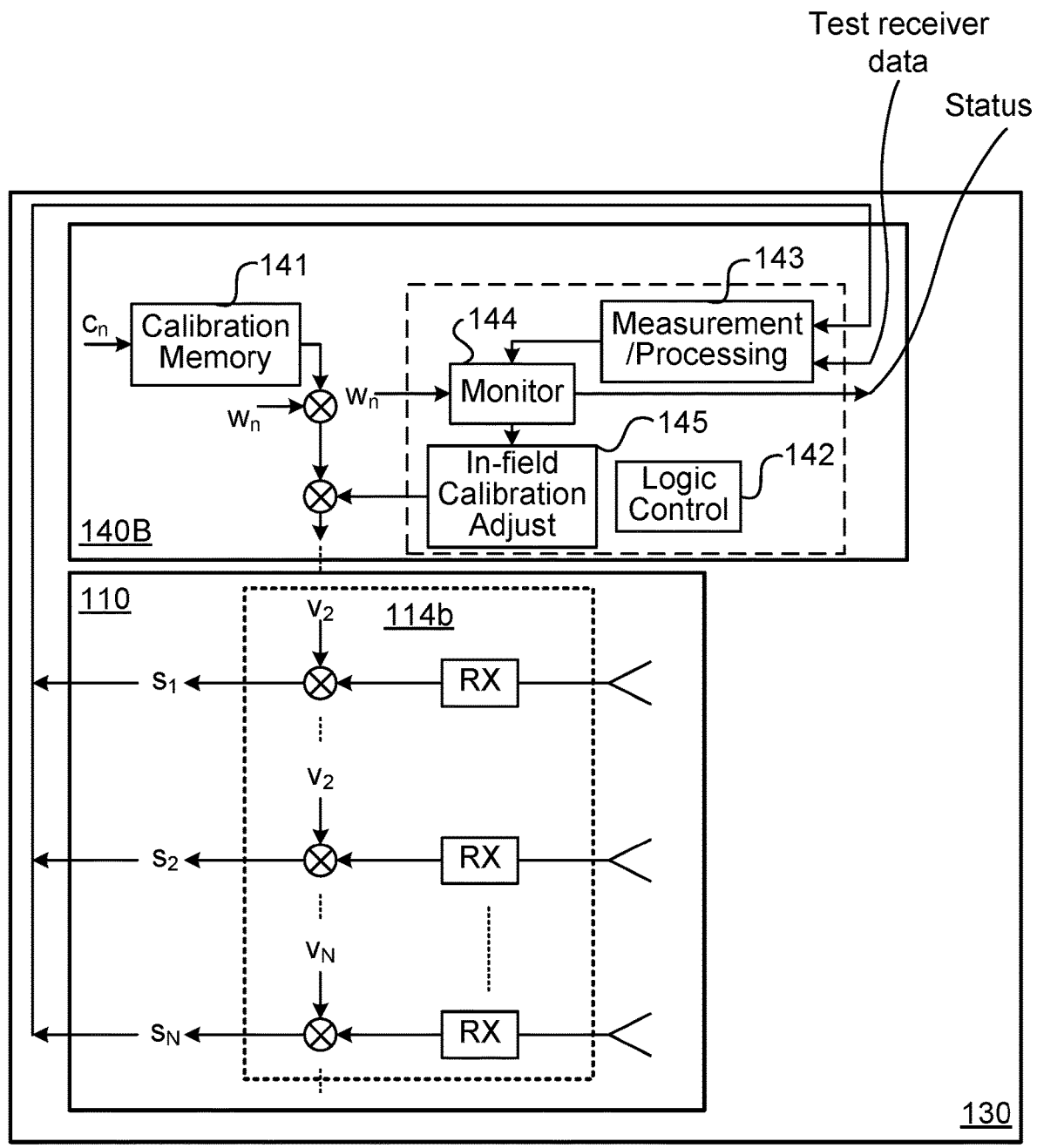

FIG. 3 and FIG. 4 illustrate components of a (radio) access node 130 comprising the first radio transceiver device 110 and an in-field calibration module 140a, 140b. FIG. 3 and FIG. 4 provide an overview of the implementation of the beam quality measurement function for the case where the first radio transceiver device 110 acts as transmitter (as in FIG. 3) and receiver (as in FIG. 4), respectively, of a signal that is wirelessly transmitted between the first radio transceiver device 110 and the second radio transceiver device 120.

The first radio transceiver device 110 comprises N transceiver branches 114a, 114b for transmission (as in FIG. 3) and reception (as in FIG. 4) of N signals $s_1, s_2, \ldots, s_N$. Each transceiver branch is affected by its own factor $V_1, V_2, \ldots, V_N$.

The in-field calibration module 140a, 140b comprises calibration memory 141, a logic control module 142, a measurement/processing module 143, a monitor module 144, and an in-field calibration adjustment module 145. $C_n$ are calibration factors as provided by a calibration process, performed either at production or during operation. The calibration memory stores the calibration factors $C_n$. $W_n$ are the beam weights for a calibrated array. The calibration cessing module is configured to receive a signal from the test receiver corresponding to transmission with one port at a time and compare phase and amplitude differences between ports with the expected values that are given by $w_n$. The logic control module is configured to manage when a beam quality measurement should be performed, control the in-field calibration module, and control other functions, e.g. transmitters, to carry out adequate and timely operations. The monitor module is configured to compare deviations between measured and expected phase and amplitude differences between ports to thresholds and to indicate their status as either ok or not ok. Optionally, the monitor module is configured to update the calibration factors $C_n$ stored in the calibration memory. The in-field calibration module is configured to apply a correction factor when the deviations between measured and expected phase and amplitude differences between ports is larger than the thresholds.

Figure 5:
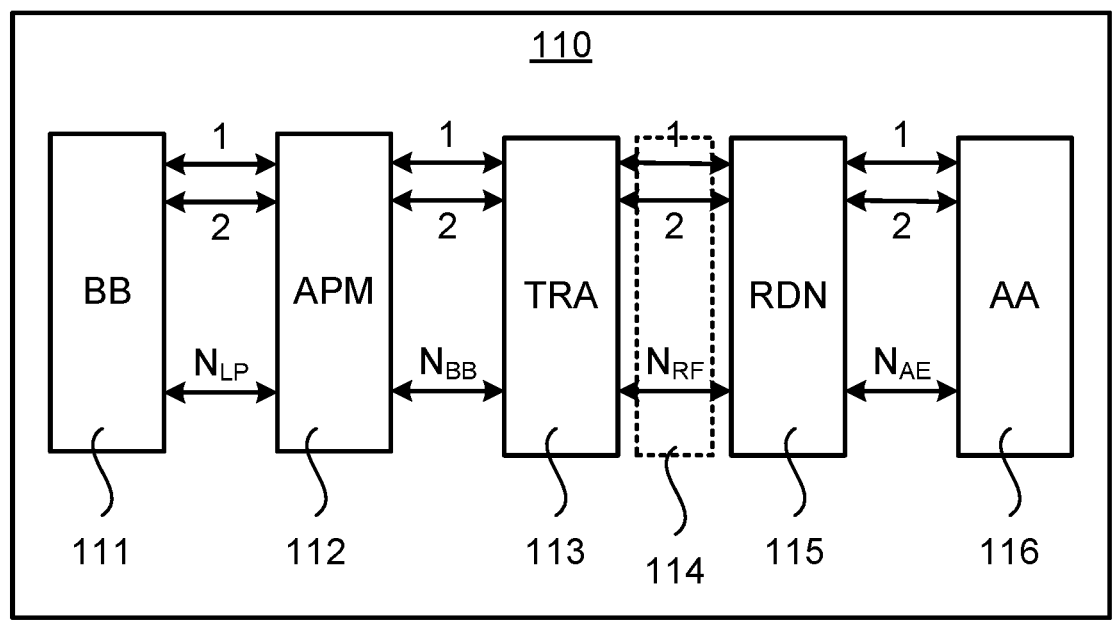
FIG. 5 schematically illustrates modules of a radio transceiver device according to an embodiment.

FIG. 5 illustrates modules of a radio transceiver device 110 according to an embodiment. The radio transceiver device 110 comprises a baseband module (BB) 111, an antenna port mapping (APM) module 112, a transceiver array (TRA) module 113, a radio distribution network (RDN) module 115 and an antenna array (AA) module 116. The modules 111-116 are interconnected via interfaces as summarized in Table 1. In this respect, the interface between the TRA module 113 and the RDN module 115 is defined by the transceiver branches 114a, 114b.

TABLE 1

| Parameters | Interface | Description |
| --- | --- | --- |
| $N_{LP}$ | BB ports | Number of supported logical ports defined in RAN1 specifications |
| $N_{BB}$ | Output/Input data streams from TRA 113 | Number of in phase/quadrature (I/Q) data transmitter streams feed to analog to digital converters (ADCs) and digital to analog converters (DACs) in TRA module 113 |
| $N_{RF}$ | Antenna reference point | Number of transceiver branches between TRA 113 and RDN module 115 |
| $N_{AE}$ | Number of antenna element transmission lines from the RDN 115 | Number of RF transmission lines between RDN module 115 and the AA module 116 |

Table 2 provides examples of relations between $N_{LP}$, $N_{BB}$, $N_{RF}$, and $N_{AE}$, for different implementations of the radio transceiver device 110.

TABLE 2

Figure 6:
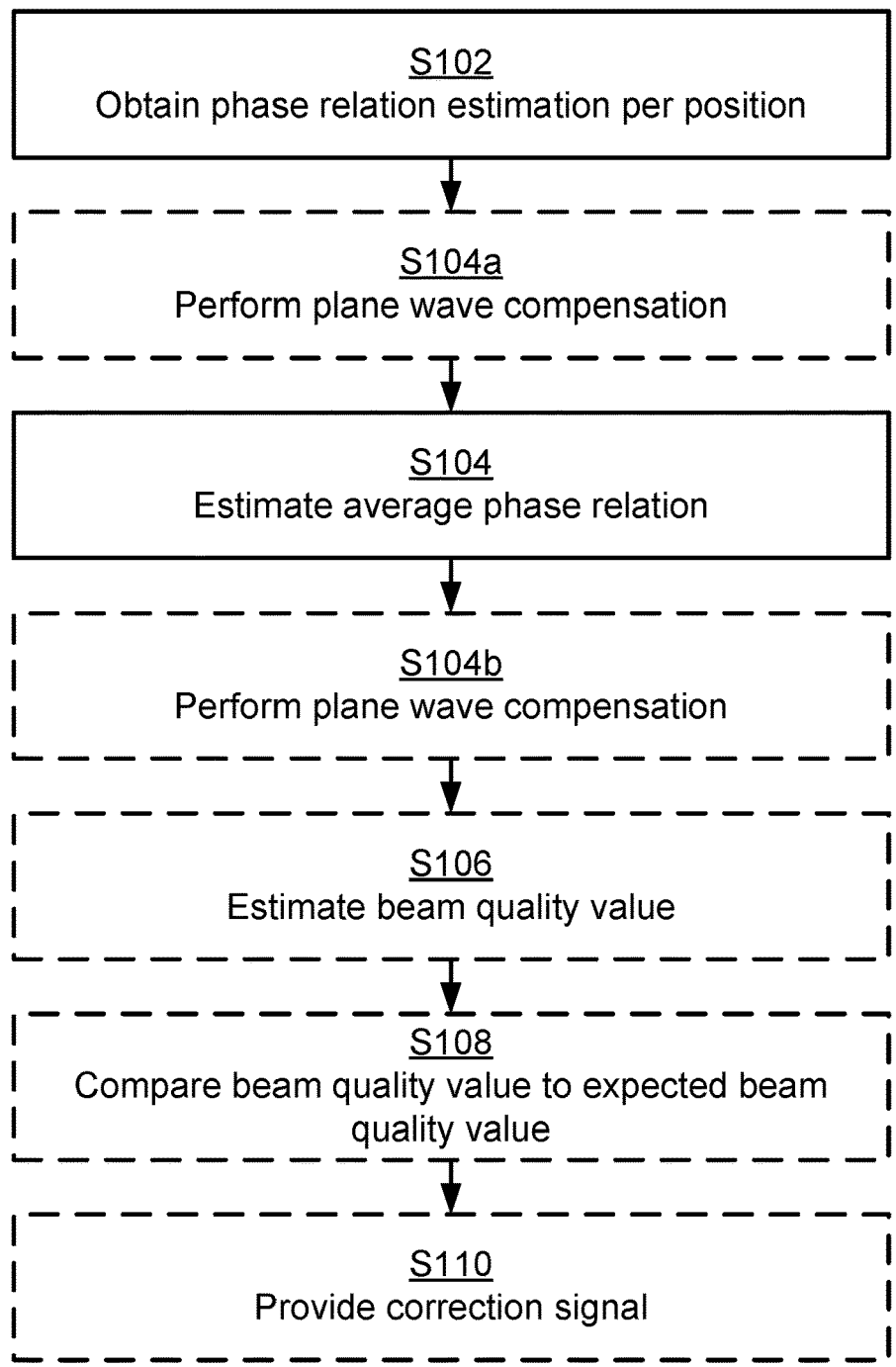
FIGS. 6 and 11 are flowcharts of methods according to embodiments.

| Beamforming | Antenna Port Mapping | Transceiver Array | Radio Distribution Network | Description |
| --- | --- | --- | --- | --- |
| Analog | $N_{LP} = N_{BB}$ | $N_{BB} < N_{RF}$ | $N_{RF} \leq N_{AE}$ | Beamforming is created in analog domain in transceiver array module |
| Digital | $N_{LP} \leq N_{BB}$ | $N_{BB} = N_{RF}$ | $N_{RF} \leq N_{AE}$ | Beamforming is created in digital domain in baseband module or antenna port mapping module |
| Hybrid | $N_{LP} \leq N_{BB}$ | $N_{BB} < N_{RF}$ | $N_{RF} \leq N_{AE}$ | Beamforming creation is split between analog and digital domains | factors and the beam weights are multiplied to the signals, and thus the product of $C_n$ with $W_n$ form the factor $V_n$ that in turn is multiplied with signal $s_n$. The calibration factors $C_n$ and the beam weights $W_n$ (and hence the factors $V_n$) are different for downlink and uplink. The measurement/pro- FIG. 6 is a flowchart illustrating embodiments of methods for OTA based estimation of phase accuracy of a first radio transceiver device 110. The methods are performed by the controller 200. The methods are advantageously provided as computer programs 1320.

S102: The controller 200 obtains, per each position in a sequence of positions of a second radio transceiver device 120 relative the first radio transceiver device 110, a phase relation estimate between transceiver branches of the first radio transceiver device 110. Each phase relation estimate is obtained from measurements on a signal wirelessly transmitted between the first radio transceiver device 110 and the second radio transceiver device 120.

S104: The controller 200 estimates an average phase relation for at least one pair of the transceiver branches of the first radio transceiver device 110 by averaging the obtained phase relation estimates over all the positions in the sequence of positions. The phase accuracy of the first radio transceiver device 110 is represented by the average phase relation for the at least one pair of the transceiver branches.

In some aspects, there will be one value of the average phase relation per each combination of pairs of transceiver branch. In some embodiments, one average phase relation is thus estimated per each pair of the transceiver branches by averaging the obtained phase relation estimates over all the positions in the sequence of positions for each pair of the transceiver branches, and the phase accuracy of the first radio transceiver device 110 is represented by the average phase relations per each pair of the transceiver branch. The average phase relation for a given transceiver branch might then represent the phase difference between that given transceiver branch and a reference transceiver branch. The average phase relation might be different for different pairs of the transceiver branches.

By considering measurements per transceiver branch, the phase relation between the transceiver branches can be estimated, and thereby checked to be as expected for the particular beam generated at the first radio transceiver device 110 when the signal is wirelessly transmitted between the first radio transceiver device 110 and the second radio transceiver device 120. Thereby, the calibration of the first radio transceiver device 110 can be checked to see if the first radio transceiver device 110 is operating properly.

The angular position of the second radio transceiver device 120 relative to the first radio transceiver device 110 can be obtained based on knowledge of the position and orientation of the first radio transceiver device 110 and knowledge of the position and orientation of the second radio transceiver device 120.

When moving the second radio transceiver device 120 in relation to the first radio transceiver device 110, the phase of the individual transceiver branches of the first radio transceiver device 110 are measured at several positions along the path. In some non-limiting examples the direction of the path along which the second radio transceiver device 120 is moving is perpendicular, or close to perpendicular, towards the line of sight. In this respect, close to perpendicular could be interpreted as deviating up to at most 30° from being perpendicular or deviating at most up to 20° from being perpendicular or deviating up to at most 10° from being perpendicular. However, it is not necessary to move the second radio transceiver device 120 in relation to the first radio transceiver device 110 in way so that the phase offset of the direct beam varies slower than the phase offset of the reflected beam. In some aspects, it is only necessary that the variation of the phase offsets is different between the direct beam and the reflected beam. By calculating and using the average value over the measurement positions of the phase relation between the transceiver branches, the impact of reflections can be mitigated for the first radio transceiver device 110 in its specific environment.

This contrasts with an uncertainty analysis of a test range, where the result of the uncertainty analysis sliding exercise will appear as an uncertainty value when later measuring on the first radio transceiver device 110, since the first radio transceiver device 110 is normally only measured in one position, and the exact impact of reflections will not be known in that particular position.

Embodiments relating to further details of OTA based estimation of phase accuracy of a first radio transceiver device 110 as performed by the controller 200 will now be disclosed.

There could be different types of signals that are wirelessly transmitted between the first radio transceiver device 110 and the second radio transceiver device 120 and that are used for the purposes disclosed above. In some embodiments the signal is a dedicated test signal. In some examples the signal is a reference signal.

In some examples, the first radio transceiver device 110 has a boresight direction, the sequence of positions forms a path, and the path extends in a direction perpendicular to the boresight direction. In other examples the conditions for the path are less restricted.

When estimating the phase for each transceiver branch, the phase variation could be compensated for, referred to as plane wave compensation. In some aspects, plane wave compensation is thus performed when estimating the average phase relation. Plane wave compensation might be performed either before or after estimation of the average phase relation (i.e., either before or after step S104). Hence, according to an embodiment, the controller 200 is configured to perform one of (optional) steps S104a, S104b:

S104a: The controller 200 performs plane wave compensation of the phase relation estimates before estimating the average phase relation.

S104b: The controller 200 performs plane wave compensation of the average phase relation.

Hence, step S104a is performed when plane wave compensation is performed before estimation of the average phase relation; whilst step S104b is performed when plane wave compensation is performed after estimation of the average phase relation.

In some aspects the average phase relation is used to estimate a quality score for the transceiver branches of the first radio transceiver device 110. In particular, in some embodiments, the controller 200 is configured to perform (optional) step S106:

S106: The controller 200 estimates a beam quality value of the first radio transceiver device 110 based on the average phase relation for the at least one pair of the transceiver branches.

There could be different ways to define the beam quality. As will be disclosed in more detail below, in the boresight direction, the higher the value of the phase difference between the transceiver branches is, the lower the beam quality will be. In some embodiments, the beam quality value pertains to phase accuracy per transceiver branch of the first radio transceiver device 110 for wireless signal transmission and/or wireless signal reception at the first radio transceiver device 110. In some examples, the beam quality value represents the worst phase deviation among all the transceiver branches.

There could be different ways to determine the beam quality. In some embodiments, the beam quality value is estimated as the measured average phase relation for the at least one pair of the transceiver branches compared to the expected phase relation for this at least one pair of the transceiver branches.

In some aspects, not only the phase but also the amplitude is taken into consideration. Thus, in some embodiments, an amplitude relation estimate between the transceiver branches per each position of the second radio transceiver device 120 relative the first radio transceiver device 110 is obtained for the sequence of positions. An average amplitude relation for the at least one pair of the transceiver branches could then be estimated by averaging the amplitude relation estimates over all the positions in the sequence of positions. The amplitude accuracy of the first radio transceiver device 110 is then represented by the average amplitude relation for the at least one pair of the transceiver branches.

In some aspects, there will be one value of the average amplitude relation per each combination of pairs of transceiver branch. In some embodiments, one average amplitude relation is thus estimated per each pair of the transceiver branches by averaging the obtained amplitude relation estimates over all the positions in the sequence of positions for each pair of the transceiver branches, and the amplitude accuracy of the first radio transceiver device 110 is represented by the average amplitude relations per each pair of the transceiver branch. The average amplitude relation for a given transceiver branch might then represent the amplitude difference between that given transceiver branch and a reference transceiver branch.

In some embodiments the beam quality value is estimated also based on the average amplitude relation. That is, the controller 200 might in step S108 estimate the beam quality value of the first radio transceiver device 110 based on the average phase relation and the average amplitude relation for the at least one pair of the transceiver branches.

The beam quality value could then further pertain to the amplitude accuracy per transceiver branch of the first radio transceiver device 110 for wireless signal transmission and/or wireless signal reception at the first radio transceiver device 110. In some examples, the beam quality value represents the worst amplitude deviation among all the transceiver branches.

The beam quality value could be estimated as the measured average amplitude relation between any given pair of the transceiver branches compared to the expected amplitude relation between this given pair of transceiver branches.

The beam quality value could be estimated as a weighted combination of the measured phase relation and the measured average amplitude relation between any given pair of the transceiver branches compared to the expected phase relation and amplitude relation between this given pair of transceiver branches.

In some embodiments the signal is wirelessly transmitted from the first radio transceiver device 110. The beam quality could then be specified in terms of the transmit amplitude and phase accuracy of each transceiver branch of the first radio transceiver device 110.

In some embodiments the signal per each position of the second radio transceiver device 120 relative the first radio transceiver device 110 is transmitted using one of the transceiver branches at a time. In further detail, the signal is wirelessly transmitted from the first radio transceiver device 110 using a single transceiver branch at a time. The transceiver array module 113 might thus be configured to individually control each single transceiver branch so that each transceiver branch is individually enabled and disabled one by one. The signal is then wirelessly transmitted using each enabled transceiver branch. Ideally the second radio transceiver device 120 should receive the signals with equal amplitude from each transceiver branch (ignoring the difference in path loss between different transceiver branches and the second radio transceiver device 120) and the phases should be related through the relation $360°\cdot((r_i-d)/\lambda)$, where $r_i$ is the distance between the second radio transceiver device 120 and transceiver branch i, where d is the distance between the second radio transceiver device 120 and one of the transceiver branches, taken as a reference transceiver branch, and $\lambda$ is the radiation wavelength.

In some embodiments the signal is wirelessly transmitted from the second radio transceiver device 120. The beam quality could then be specified in terms of the receive amplitude and phase accuracy of each transceiver branch of the first radio transceiver device 110.

In some embodiments the signal per each position of the second radio transceiver device 120 relative the first radio transceiver device 110 is simultaneously received in all the transceiver branches. In further detail, the signal is wirelessly transmitted from the second radio transceiver device 120 towards the first radio transceiver device 110. Ideally, the signal received at the first radio transceiver device 110 has equal amplitude in all transceiver branches (ignoring the difference in path loss between different transceiver branches and the second radio transceiver device 120) and a phase relation should be given by $360°\ ((r_i-d)/\lambda)$ in the same way as disclosed above.

Figure 7:
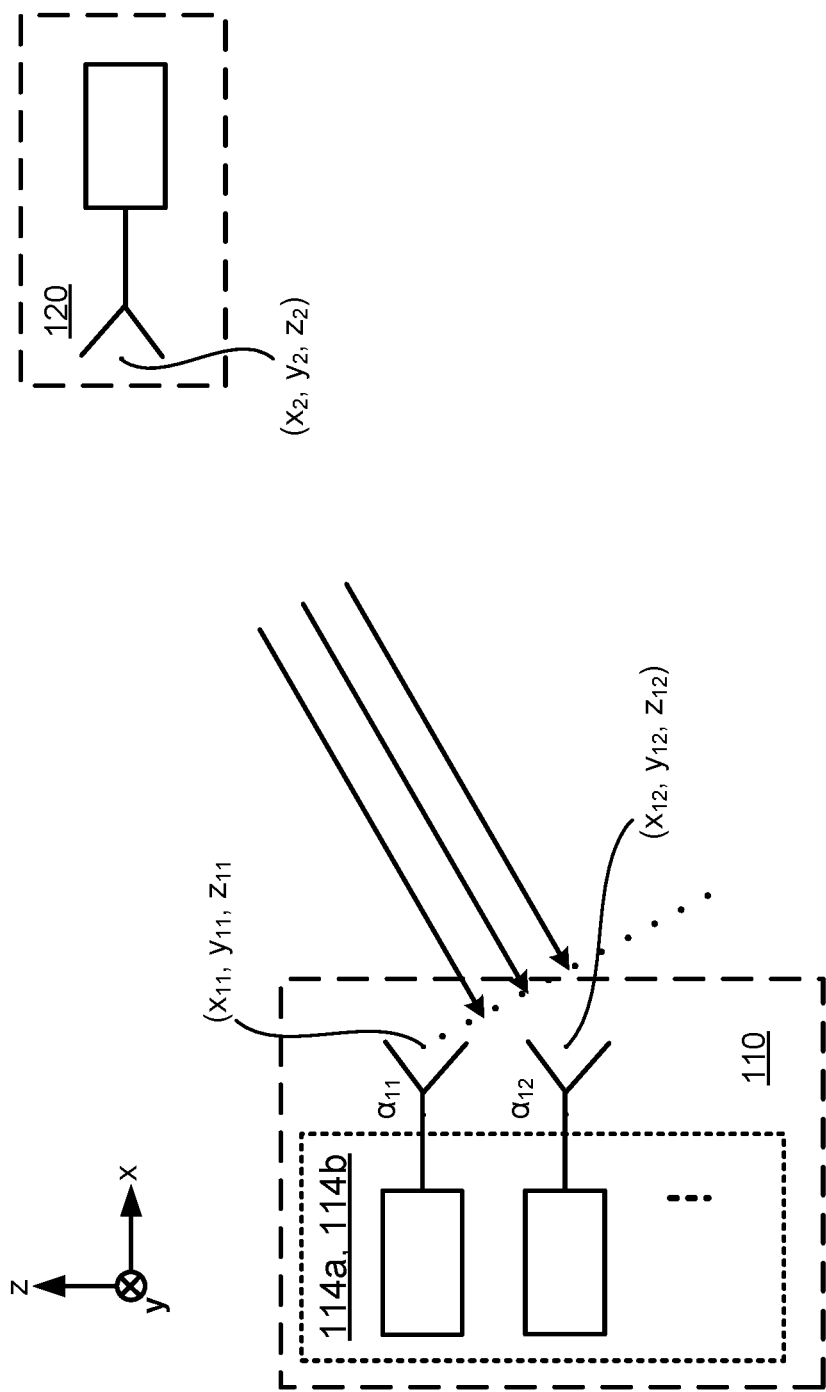
FIG. 7 schematically illustrates expected phase difference between two transceiver branches according to an embodiment.

As illustrated in FIG. 7, the expected phase difference between two transceiver branches, on top of the beam weight phase difference, might also include a phase difference, Aa, contribution. The phase difference arises from the difference in distance between the antenna at the second radio transceiver device 120 and each of the antennas for the different transceiver branches at the first radio transceiver device 110. For example, in FIG. 7, between transceiver branch 1 having position $(x_{11}, y_{11}, z_{11})$ and phase $\alpha_{11}$ and transceiver branch 2 having position $(x_{12}, y_{12}, z_{12})$ and phase $\alpha_{12}$ and the antenna of the second radio transceiver device 120 having position $(x_2, y_2, z_2)$, the phase difference can be expressed as:

$$\Delta\alpha = \frac{2\pi \cdot (|(x_{11}, y_{11}, z_{11}) - (x_2, y_2, z_2)| - |(x_{12}, y_{12}, z_{12}) - (x_2, y_2, z_2)|)}{\lambda}$$

With knowledge of the antenna position of the second radio transceiver device 120 and the position and orientation as well as the antenna system geometry and configuration of the first radio transceiver device 110, it is possible to calculate, and thereafter compensate for, this phase difference.

As noted above, the calibration of the first radio transceiver device 110 can be checked to see if the first radio transceiver device 110 is operating properly. In particular, in some embodiments, the controller 200 is configured to perform (optional) steps S108 and S110:

S108: The controller 200 compares a value of the average phase relation for the at least one pair of the transceiver branches to an expected phase relation value for the at least one pair of the transceiver branches.

S110: The controller 200 provides a correction signal to a calibration module of the first radio transceiver device 110 when the value of the average phase relation deviates more than a threshold value from the expected phase relation value.

The controller 200 could thereby implement a monitor sub-function that is checking the resulting value of the average phase relation with expected excitation information stored in a calibration memory. The expected excitation information could be determined in production or in normal operation.

There could be different uses of the correction signal. In some embodiments the correction signal is provided for initiating calibration of the transceiver branches at the first radio transceiver device 110. In some examples, the correction signal is provided to halt operation of the first radio transceiver device 110. The latter could be the case when the value of the average phase relation deviates more than a second threshold value from the expected phase relation value, where the second threshold value is larger than the threshold value used in step S110. If the resulting value of the average phase relation is diverging from the expected excitation, a fault signal, defined by the correction signal, could thus be set to signal degraded performance or initiate run time calibration procedure.

There could be different examples of correction signals. In some embodiments the correction signal is a warning signal. In other embodiments the correction signal is the value of the average phase relation itself. The difference between the value of the average phase relation and the expected excitation could then be used to calibrate the first radio transceiver device in the field.

Aspects of how the herein disclosed embodiments can be applied to reduce impacts of reflections during the OTA based estimation of phase accuracy of the first radio transceiver device 110 will now be disclosed.

When performing in-the-field measurements on installed radio transceiver devices, such as (radio) access nodes or other types of base stations, reflections from surrounding objects, such as building walls, trees, vehicles, rocks, etc., can occur. This could potentially introduce errors in both the transmit and receive beam quality measurements. However, by moving the second radio transceiver device 120 along a suitable path whilst performing a set of measurements which are then averaged, the impact of reflections can be significantly reduced.

Consider the measurement of the phase difference, denoted $\Delta\varphi$, between two transceiver branches at the first radio transceiver device 110. Assume that the signal is wirelessly transmitted from the first radio transceiver device 110 towards the second radio transceiver device 120. The direct components of the signals arriving at the antenna of the second radio transceiver device 120 from the two transceiver branches at the first radio transceiver device 110 are denoted $s_1$ and $s_2$. The signals arriving at the antenna of the second radio transceiver device 120 from the two transceiver branches at the first radio transceiver device 110 after reflection against an object 150 are denoted $r_1^1$ and $r_2^1$, see FIG. 2.

Assume, without loss of generality, that the path length and pathloss between the second radio transceiver device 120 and the two transceiver branches at the first radio transceiver device 110 are the same (i.e., that the first radio transceiver device 110 and the second radio transceiver device 120 are in boresight with respect to each other). Then:

$$s_1 = s_a e^{j(\varphi_0 + \Delta\varphi/2)}$$

$$s_2 = s_a e^{j(\varphi_0 + \Delta\varphi/2)}$$

Here, $s_a$ denotes the signal amplitude, which thus is the same for the two signals $s_1$ and $s_2$.

Furthermore, assume that the beam used to transmit the signals $s_1$ and $s_2$ from the first radio transceiver device 110 is pointing towards the second radio transceiver device 120. For a perfect beam the phase difference $\Delta\varphi$ between the transceiver branches is then zero. Higher values of the phase difference between the transceiver branches correspond to a lower beam quality.

Ideally the desired phase difference can be obtained as:

$$\Delta\varphi = \angle s_1 - \angle s_2$$

Here, $\angle s_1$ represents the phase of $s_1$, and $\angle s_2$ represents the phase of $s_2$. However, if the measured values, denoted $y_1$ and $y_2$, also include the reflection against object 150, then:

$$y_1 = s_1 + r_1^1$$

$$y_2 = s_2 + r_2^1$$

The estimated phase difference, $\widetilde{\Delta\varphi}$, can be expressed as:

$$\widetilde{\Delta\varphi} = \angle y_1 - \angle y_2$$

Here, $\angle y_1$ represents the phase of $y_1$, and $\angle y_2$ represents the phase of $y_2$. The reflected signals can be written:

$$r_1^1 = r_a^1 e^{j(\varphi_0^1 + \Delta\varphi^1/2)}$$

$$r_2^1 = r_a^1 e^{j(\varphi_0^1 + \Delta\varphi^1/2)}$$

Here, $r_a^1$ is the amplitude of reflection against object 150 and is approximated to be the same for the reflections from the two transceiver branches. The difference $\Delta\varphi^1$ differs from $\Delta\varphi$ by a value given by the angle to the object 150. This will introduce an error in the estimate $\widetilde{\Delta\varphi}$.

It is noted that in the event that there are M reflections, the expressions for $y_1$ and $y_2$ would take the general form:

$$y_1 = s_1 + \sum_{m=1}^{M} r_1^m$$

$$y_2 = s_2 + \sum_{m=1}^{M} r_2^m$$

It is further noted that in the event that there are M reflections, the reflected signals would, for m=1, . . . , M, take the general form:

$$r_1^m = r_a^m e^{j(\varphi_0^m + \Delta\varphi^m/2)}$$

$$r_2^m = r_a^m e^{j(\varphi_0^m + \Delta\varphi^m/2)}$$

Figure 8:
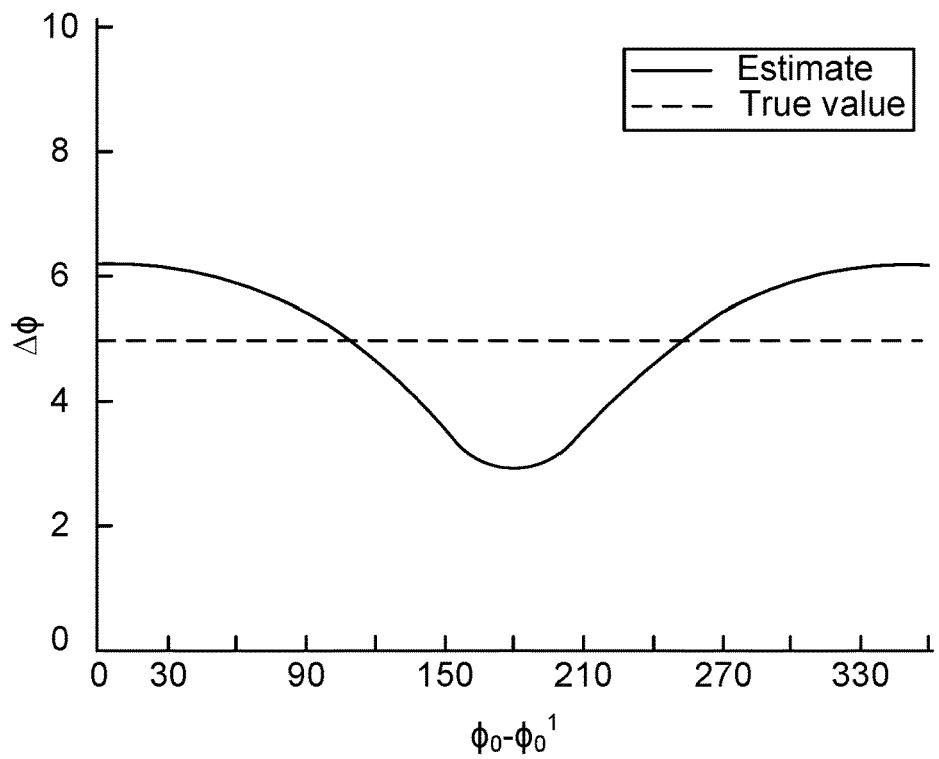
FIGS. 8, 9 and 10 show simulation results according to an embodiment.

FIG. 8 schematically illustrates how the error might impact in different ways depending on the difference in phase offsets, $\varphi_0 - \varphi_0^1$, between the direct component of the signal (as given by $\varphi_0$) and the signal as reflected (as given by $\varphi_0^1$). If measurements can be obtained with different values of $\varphi_0 - \varphi_0^1$, an average over these values would provide a much better estimate of $\Delta\varphi$ than a single measurement.

One possible way to obtain a variation in the difference between the phase offsets is to perform a sequence of measurements along a path approximately perpendicular to the direction from the second radio transceiver device 120 to the first radio transceiver device 110. The value of $\varphi_0$ will then be approximately constant whereas the value of $\varphi_0^1$ will vary. An average could then be performed over the obtained measurements.

Thus, consider a sequence of measurements k=1 . . . K, performed as the measurement device is moved along a path with a step length $l_{sample}$. In each step, the phase offset $\varphi_0$ of the signal changes by an amount $2\pi l/\lambda$ whereas the phase offset $\varphi_0^1$ of the reflection changes by an amount $2\pi l_1/\lambda$. Then:

$l = l_{sample} \sin \beta$ $l_A = l_{sample} \sin(\alpha_1 + \beta)$

Ideally, the path could be selected as perpendicular to the direction from the second radio transceiver device 120 to the first radio transceiver device 110, resulting in l=0, but values of β up to about 30° from the perpendicular direction still give good performance. The phase offsets will become:

$\varphi_0 = k2\pi l/\lambda$ $\varphi_0^1 = k2\pi l_1/\lambda$

Finally, the wanted estimate $\widetilde{\Delta\varphi}$ of the phase difference can be obtained as an average over the sequence of measurements:

$$\widetilde{\Delta\varphi} = \frac{1}{K}\sum_{k=1}^{K} \angle y_1(k) - \angle y_2(k)$$

Figure 9:
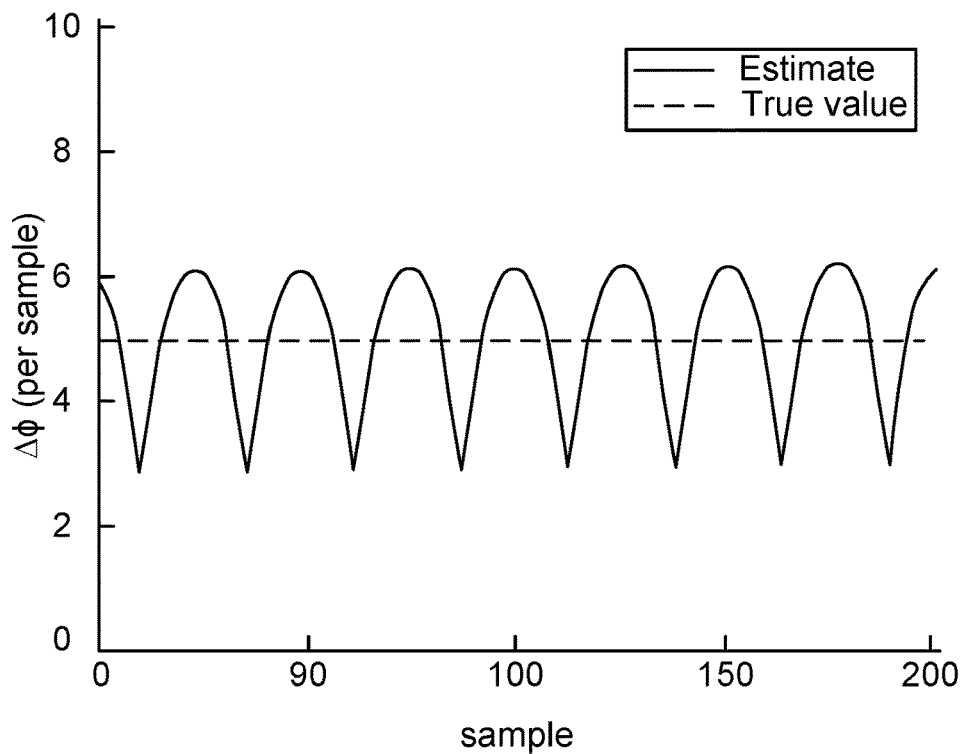

FIG. 9 shows an example at frequency 3.5 GHz, and with true value Δφ=5° (corresponding to a rather small defect in phase relation between the two transceiver branches), reflection amplitude 10 dB below the signal and β=5°, $\alpha_A$=20°, $l_{sample}$=1 cm, and K=200.

Figure 10:
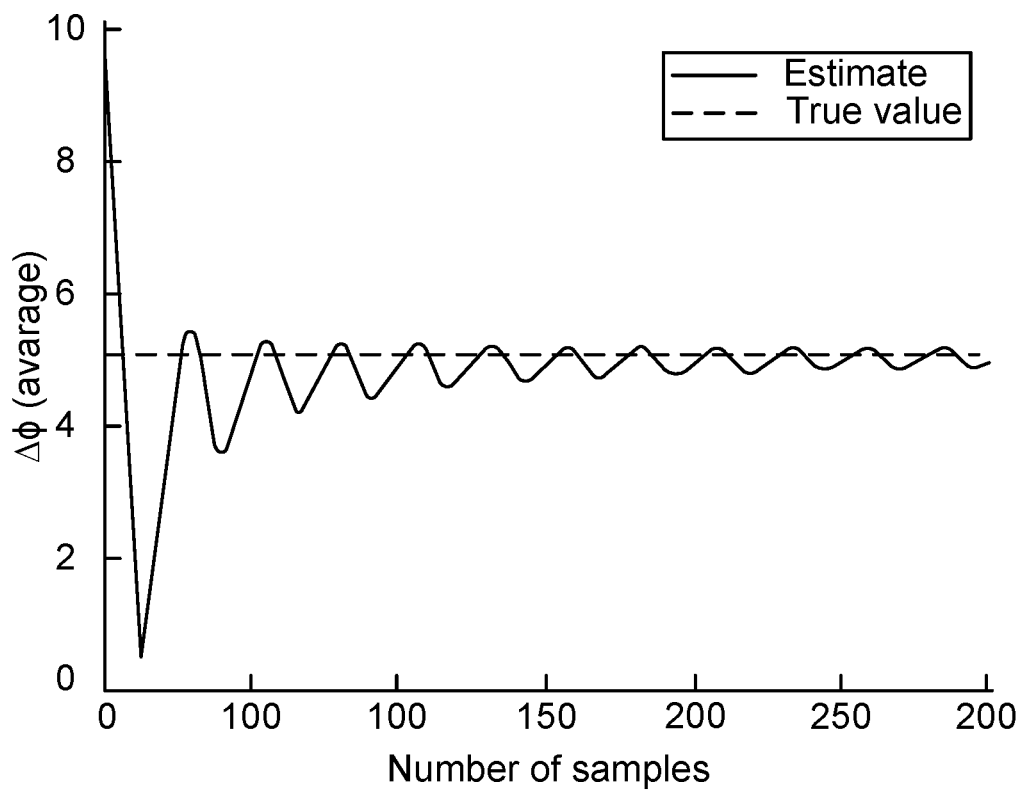

To get an optimal estimate, the average should be taken over an integer number of periods of Δφ. In practice this may not be possible, in particular not if there are more than one dominating reflection, which will result in more irregular measurement results. As illustrated in FIG. 10, by instead averaging over a reasonably long measurement sequence, the impact of the exact choice of the number of samples will become small.

Figure 11:
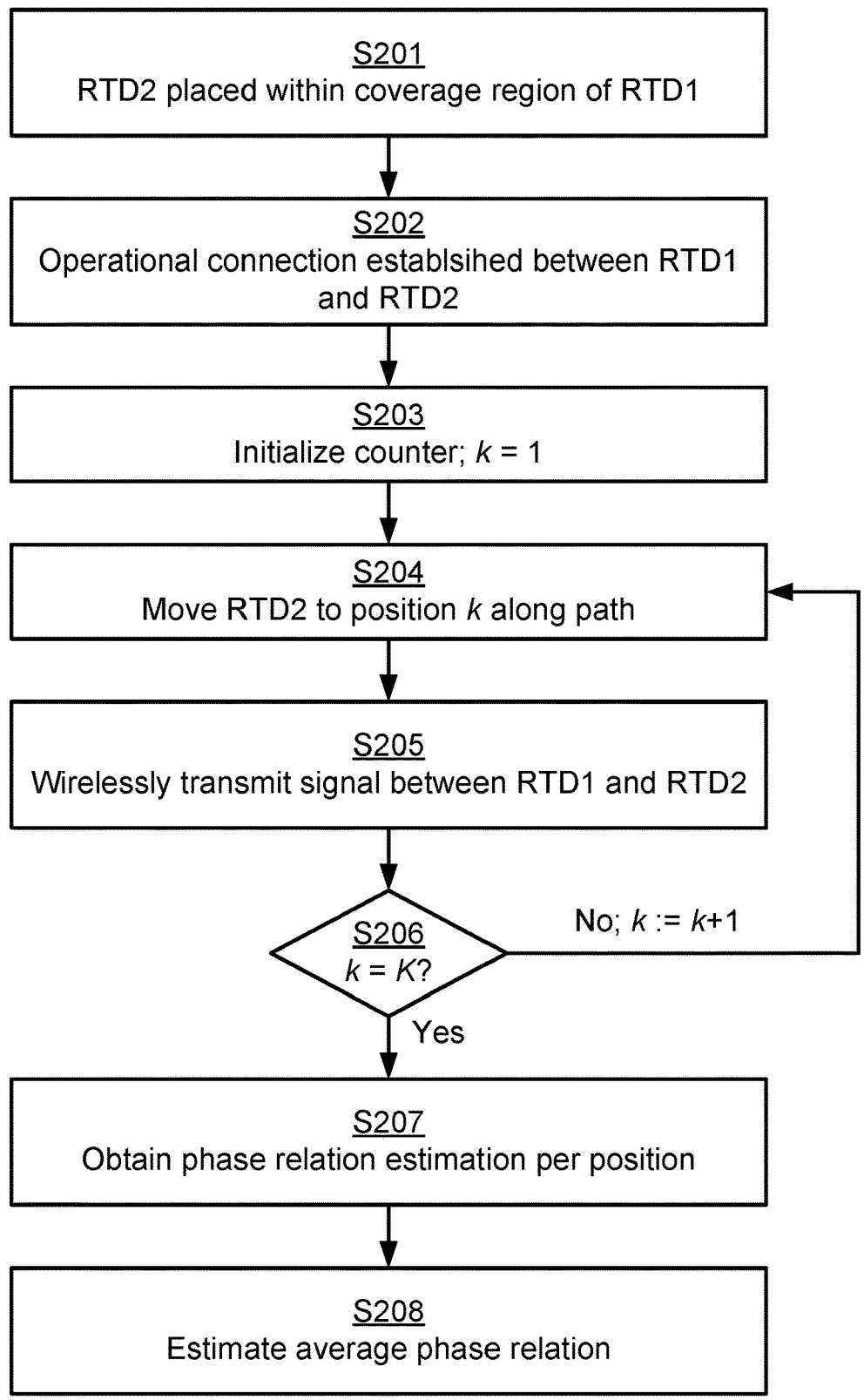

One method for OTA based estimation of phase accuracy of a first radio transceiver device 110 based on at least some of the above disclosed embodiments will be disclosed next with reference to FIG. 11.

S201: The second radio transceiver device 120 (RTD2) is placed to be within the coverage region of the first radio transceiver device 110 (RTD1).

S202: An operational connection is established between the first radio transceiver device 110 and the second radio transceiver device 120.

S203: A counter is initialized to k=1.

S204: The second radio transceiver device 120 is moved to position k along a path.

S205: A signal is wirelessly transmitted between the first radio transceiver device 110 and second radio transceiver device 120 whilst the second radio transceiver device 120 is located at position k.

The signal is either wirelessly transmitted from the first radio transceiver device 110 towards the second radio transceiver device 120, or from the second radio transceiver device 120 towards the first radio transceiver device 110. Measurements are recorded and provided to the controller 200 that enables the controller 200 to estimate phase relations between the transceiver branches of the first radio transceiver device 110.

S206: It is checked whether or not the desired number of measurements K have been made, i.e., if k=K. If yes, step S207 is entered. If no, the counter is incremented, i.e., k: = k+1 and step S205 is entered again.

S207: The controller 200 obtains, per each position in a sequence of positions of a second radio transceiver device 120 relative the first radio transceiver device 110, a phase relation estimate between transceiver branches of the first radio transceiver device 110. Each phase relation estimate is obtained from measurements on a signal wirelessly transmitted between the first radio transceiver device 110 and the second radio transceiver device 120.

Figure 12:
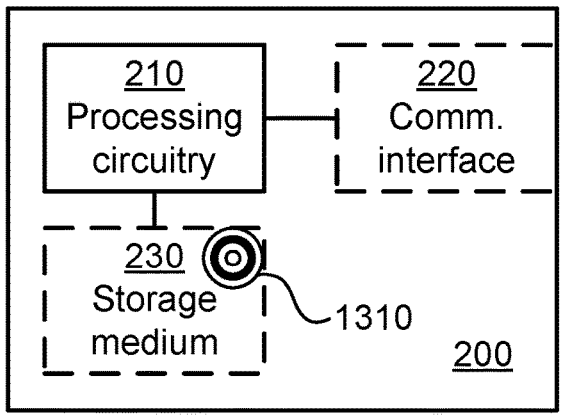
FIG. 12 is a schematic diagram showing functional units of a controller according to an embodiment.

S208: The controller 200 estimates an average phase relation for the transceiver branches of the first radio transceiver device 110 by averaging the obtained phase relation estimates over all the positions in the sequence of positions. One average phase relation is estimated per each of the transceiver branches by averaging the obtained phase relation estimates over all the positions in the sequence of positions, and the phase accuracy of the first radio transceiver device 110 is represented by the average phase relation per transceiver branch. Plane wave compensation might be performed as part of step S208 either before or after estimation of the average phase relation FIG. 12 schematically illustrates, in terms of a number of functional units, the components of a controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310 (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the controller 200 to perform a set of operations, or steps, as disclosed above. For example, the storage medium 230 may store the set of operations, and the processing circuitry 210 may be configured to retrieve the set of operations from the storage medium 230 to cause the controller 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The controller 200 may further comprise a communications interface 220 at least configured for communications with the first radio transceiver device 110 and the second radio transceiver device 120. As such the communications interface 220 may comprise one or more transmitters and receivers, comprising analogue and digital components. The processing circuitry 210 controls the general operation of the controller 200 e.g. by sending data and control signals to the communications interface 220 and the storage medium 230, by receiving data and reports from the communications interface 220, and by retrieving data and instructions from the storage medium 230. Other components, as well as the related functionality, of the controller 200 are omitted in order not to obscure the concepts presented herein.

Figure 13:
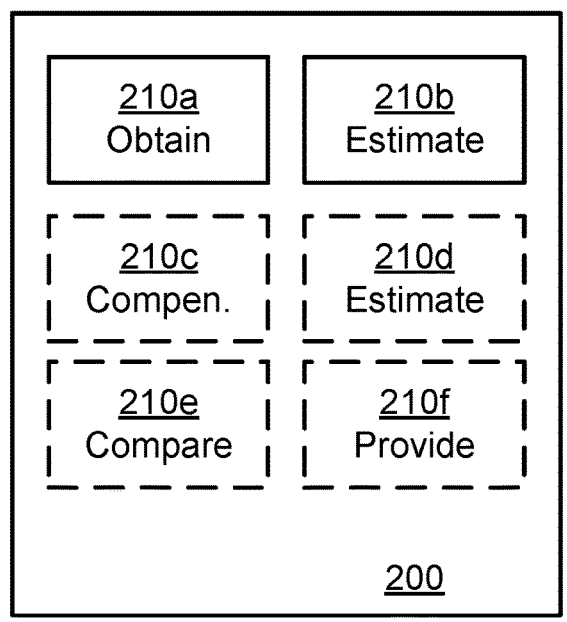
FIG. 13 is a schematic diagram showing functional modules of a controller according to an embodiment.

FIG. 13 schematically illustrates, in terms of a number of functional modules, the components of a controller 200 according to an embodiment. The controller 200 of FIG. 13 comprises a number of functional modules; an obtain module 210a configured to perform step S102, and an estimate module 210b configured to perform step S104. The controller 200 of FIG. 13 may further comprise a number of optional functional modules, such as any of a compensate module 210c configured to perform steps S104a and S104b, an estimate module 210d configured to perform step S106, a compare module 210e configured to perform step S108, and a provide module 210f configured to perform step S110. In general terms, each functional module 210a-210f may in one embodiment be implemented only in hardware and in another embodiment with the help of software, i.e., the latter embodiment having computer program instructions stored on the storage medium 230 which when run on the processing circuitry makes the controller 200 perform the corresponding steps mentioned above in conjunction with FIG. 6. With reference back again to FIGS. 3 and 4, the obtain module 210a might implement at least partly the functionality of the measurement/processing module. Further, the estimate module 210b might implement at least partly the functionality of the measurement/processing module. Further, the compare module 210e might implement at least partly the functionality of the monitor module. Further, the provide module 210f might implement at least partly the functionality of the in in-field calibration module.

It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with the communications interface 220 and/or the storage medium 230. The processing circuitry 210 may thus be configured to from the storage medium 230 fetch instructions as provided by a functional module 210a-210f and to execute these instructions, thereby performing any steps as disclosed herein.

The controller 200 may be provided as a standalone device or as a part of at least one further device. For example, the controller 200 may be provided in a node of a (radio) access network or in a node of a core network. Alternatively, functionality of the controller 200 may be distributed between at least two devices, or nodes. These at least two nodes, or devices, may either be part of the same network part (such as the (radio) access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the controller 200 may be executed in a first device, and a second portion of the of the instructions performed by the controller 200 may be executed in a second device; the herein disclosed embodiments are not limited to any particular number of devices on which the instructions performed by the controller 200 may be executed. Hence, the methods according to the herein disclosed embodiments are suitable to be performed by a controller 200 residing in a cloud computational environment. Therefore, although a single processing circuitry 210 is illustrated in FIG. 12 the processing circuitry 210 may be distributed among a plurality of devices, or nodes. The same applies to the functional modules 210a-210f of FIG. 13 and the computer program 1320 of FIG. 14.

Figure 14:
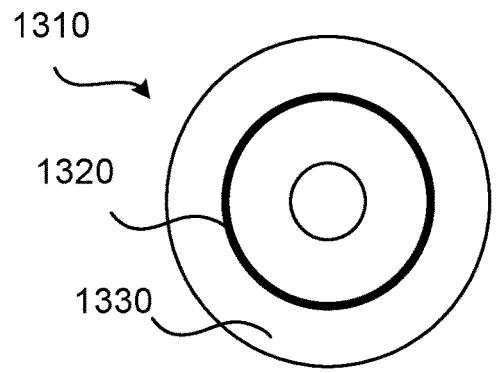
FIG. 14 shows one example of a computer program product comprising computer readable storage medium according to an embodiment.

FIG. 14 shows one example of a computer program product 1310 comprising computer readable storage medium 1330. On this computer readable storage medium 1330, a computer program 1320 can be stored, which computer program 1320 can cause the processing circuitry 210 and thereto operatively coupled entities and devices, such as the communications interface 220 and the storage medium 230, to execute methods according to embodiments described herein. The computer program 1320 and/or computer program product 1310 may thus provide means for performing any steps as herein disclosed.

In the example of FIG. 14, the computer program product 1310 is illustrated as an optical disc, such as a CD (compact disc) or a DVD (digital versatile disc) or a Blu-Ray disc. The computer program product 1310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320 is here schematically shown as a track on the depicted optical disk, the computer program 1320 can be stored in any way which is suitable for the computer program product 1310.

Figure 15:
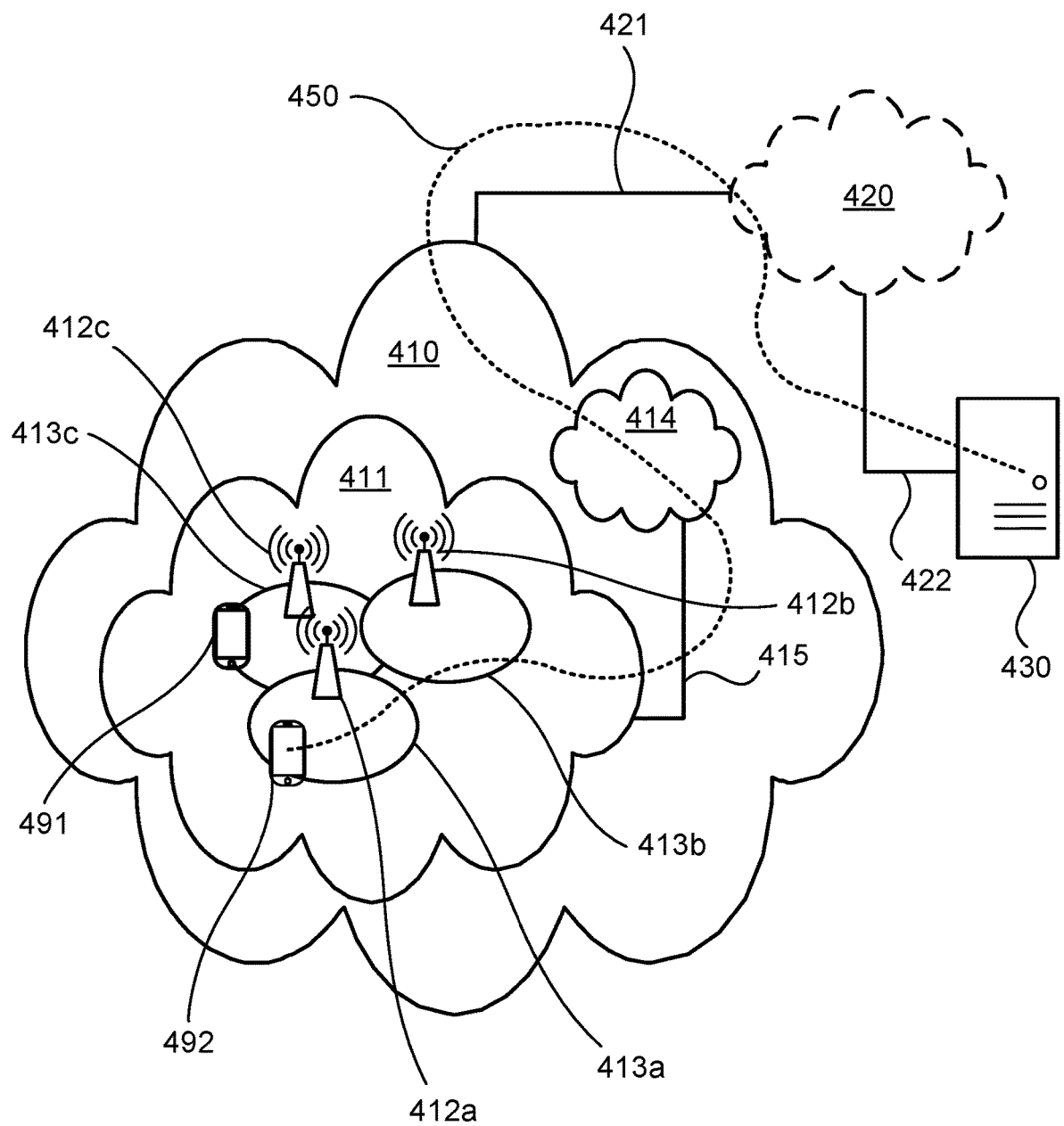
FIG. 15 is a schematic diagram illustrating a telecommunication network connected via an intermediate network to a host computer in accordance with some embodiments.

FIG. 15 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, and core network 414. Access network 411 comprises a plurality of radio access network nodes 412a, 412b, 412c, such as NBs, eNBs, gNBs (each corresponding to the first radio transceiver device 110 of FIG. 2) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the second radio transceiver device 120 of FIG. 2.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 15 as a whole enables connectivity between the connected UEs 491, 492 and host computer 430. The connectivity may be described as an over-the-top (OTT) connection 450. Host computer 430 and the connected UEs 491, 492 are configured to communicate data and/or signalling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 16:
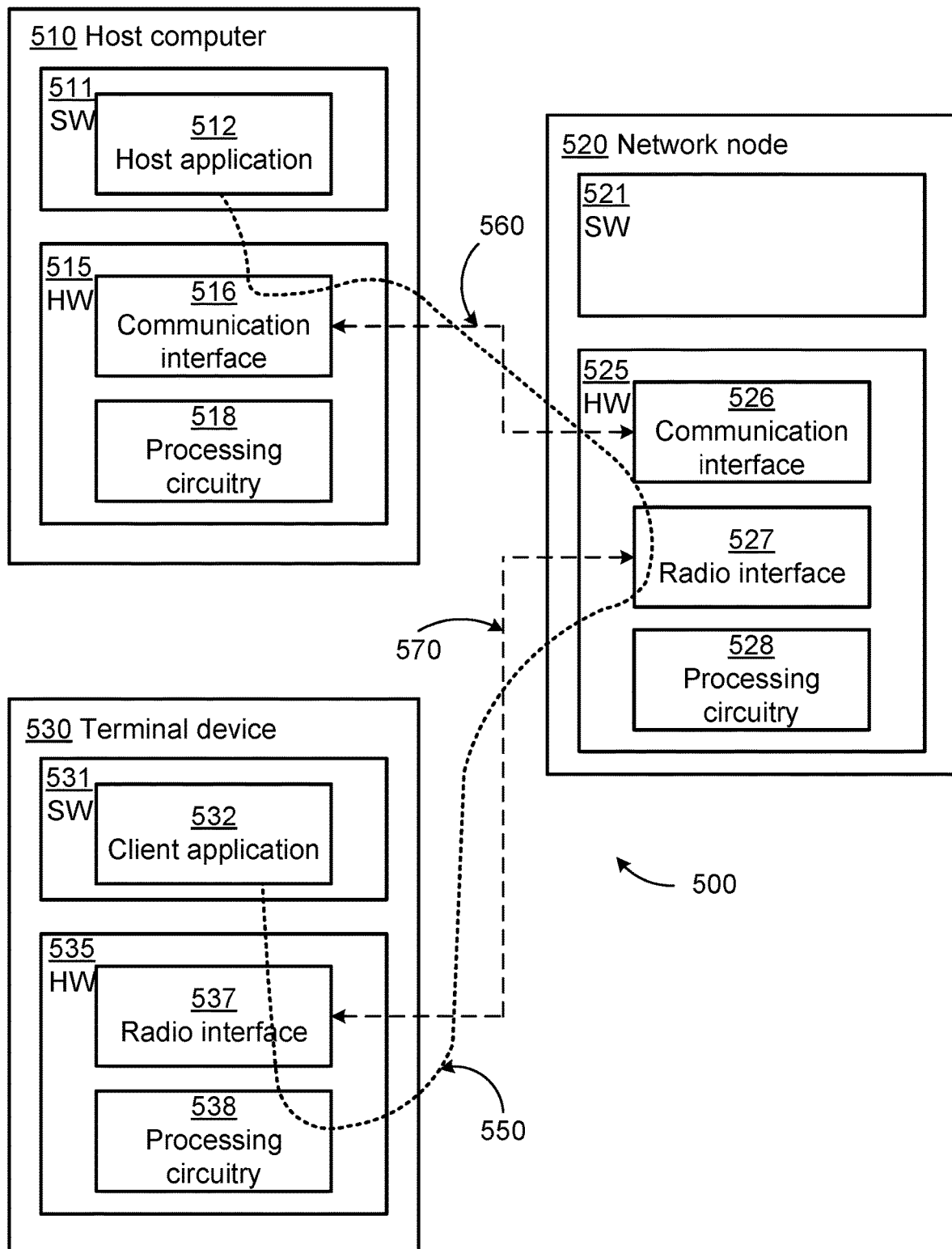
FIG. 16 is a schematic diagram illustrating host computer communicating via a radio base station with a terminal device over a partially wireless connection in accordance with some embodiments.

FIG. 16 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 16. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the second radio transceiver device 120 of FIG. 2. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the first radio transceiver device 110 of FIG. 2. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 16) served by radio access network node 520. Communication interface 526 may be configured to facilitate connection 560 to host computer 510. Connection 560 may be direct or it may pass through a core network (not shown in FIG. 16) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 16 may be similar or identical to host computer 430, one of network nodes 412a, 412b, 412c and one of UEs 491, 492 of FIG. 15, respectively. This is to say, the inner workings of these entities may be as shown in FIG. 16 and independently, the surrounding network topology may be that of FIG. 15.

In FIG. 16, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signalling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for over-the-air, OTA, based estimation of phase accuracy of a first radio transceiver device for mitigating the impact of reflections for the first radio transceiver device in its specific environment, the method being performed by a controller, the method comprising:
obtaining, per each position in a sequence of positions of a second radio transceiver device relative the first radio transceiver device, a phase relation estimate between transceiver branches of the first radio transceiver device, wherein each phase relation estimate is obtained from measurements on a signal wirelessly transmitted between the first radio transceiver device and the second radio transceiver device; and
estimating an average phase relation for at least one pair of the transceiver branches of the first radio transceiver device by averaging the obtained phase relation estimates over all the positions in the sequence of positions, wherein the phase accuracy of the first radio transceiver device is represented by the average phase relation for the at least one pair of the transceiver branches.

2. The method according to claim 1, wherein one average phase relation is estimated per each pair of the transceiver branches by averaging the obtained phase relation estimates over all the positions in the sequence of positions for each pair of the transceiver branches, and wherein the phase accuracy of the first radio transceiver device is represented by the average phase relations per each pair of the transceiver branch.

3. The method according to claim 1, further comprising:
estimating a beam quality value of the first radio transceiver device based on the average phase relation for the at least one pair of the transceiver branches.

4. The method according to claim 3, wherein the beam quality value pertains to phase accuracy per transceiver branch of the first radio transceiver device for at least one of wireless signal transmission and wireless signal reception at the first radio transceiver device.

5. The method according to claim 3, wherein the beam quality value is estimated as measured average phase relation for the at least one pair of the transceiver branches compared to expected phase relation for said at least one pair of the transceiver branches.

6. The method according to claim 1, wherein an amplitude relation estimate between the transceiver branches per each position of the second radio transceiver device relative the first radio transceiver device is obtained for the sequence of positions, wherein an average amplitude relation for the at least one pair of the transceiver branches is estimated by averaging the amplitude relation estimates over all the positions in the sequence of positions, and wherein amplitude accuracy of the first radio transceiver device is represented by the average amplitude relation for the at least one pair of the transceiver branches.

7. The method according to claim 1, further comprising:
performing plane wave compensation either of the phase relation estimates before estimating the average phase relation or of the average phase relation.

8. The method according to claim 1, wherein the signal is wirelessly transmitted from the first radio transceiver device.

9. The method according to claim 1, wherein the signal is wirelessly transmitted from the second radio transceiver device.

10. The method according to claim 1, further comprising:
comparing a value of the average phase relation for the at least one pair of the transceiver branches to an expected phase relation value for the at least one pair of the transceiver branches; and
providing a correction signal to a calibration module of the first radio transceiver device when the value of the average phase relation deviates more than a threshold value from the expected phase relation value.

11. The method according to claim 10, wherein the correction signal is either a warning signal or the value of the average phase relation itself.

12. The method according to claim 10, wherein the correction signal is provided for initiating calibration of the transceiver branches at the first radio transceiver device.

13. The method according to claim 1, wherein the signal is a dedicated test signal.

14. The method according to claim 1, wherein the first radio transceiver device has a boresight direction, wherein the sequence of positions forms a path, and wherein the path extends in a direction perpendicular to the boresight direction.

15. The method according to claim 1, wherein the controller is part of the first radio transceiver device, the second radio transceiver device, or a network controller.

16. The method according to claim 1, wherein the first radio transceiver device is part of an access node.

17. The method according to claim 1, wherein the second radio transceiver device is part of a user equipment.

18. A controller for over-the-air, OTA, based estimation of phase accuracy of a first radio transceiver device for mitigating the impact of reflections for the first radio transceiver device in its specific environment, the controller comprising processing circuitry, the processing circuitry being configured to cause the controller to:
obtain, per each position in a sequence of positions of a second radio transceiver device relative the first radio transceiver device, a phase relation estimate between transceiver branches of the first radio transceiver device, wherein each phase relation estimate is obtained from measurements on a signal wirelessly transmitted between the first radio transceiver device and the second radio transceiver device; and
estimate an average phase relation for at least one pair of the transceiver branches of the first radio transceiver device by averaging the obtained phase relation estimates over all the positions in the sequence of positions, wherein the phase accuracy of the first radio transceiver device is represented by the average phase relation for the at least one pair of the transceiver branches.

19. A computer program for over-the-air, OTA, based estimation of phase accuracy of a first radio transceiver device, the computer program comprising computer code which, when run on processing circuitry of a controller, causes the controller to:
- obtain, per each position in a sequence of positions of a second radio transceiver device relative the first radio transceiver device, a phase relation estimate between transceiver branches of the first radio transceiver device, wherein each phase relation estimate is obtained from measurements on a signal wirelessly transmitted between the first radio transceiver device and the second radio transceiver device; and
- estimate an average phase relation for at least one pair of the transceiver branches of the first radio transceiver device by averaging the obtained phase relation estimates over all the positions in the sequence of positions, wherein the phase accuracy of the first radio transceiver device is represented by the average phase relation for the at least one pair of the transceiver branches.

* * * * *